June 6, 1967  H. F. SILVER ET AL  3,323,948
PROCESS FOR THE EXTRACTION OF SUGAR FROM SUGAR CANE
Filed April 21, 1966  9 Sheets-Sheet 8

INVENTORS
Harold F. Silver,
Clarence R. Steele,
BY Frank B. Price,

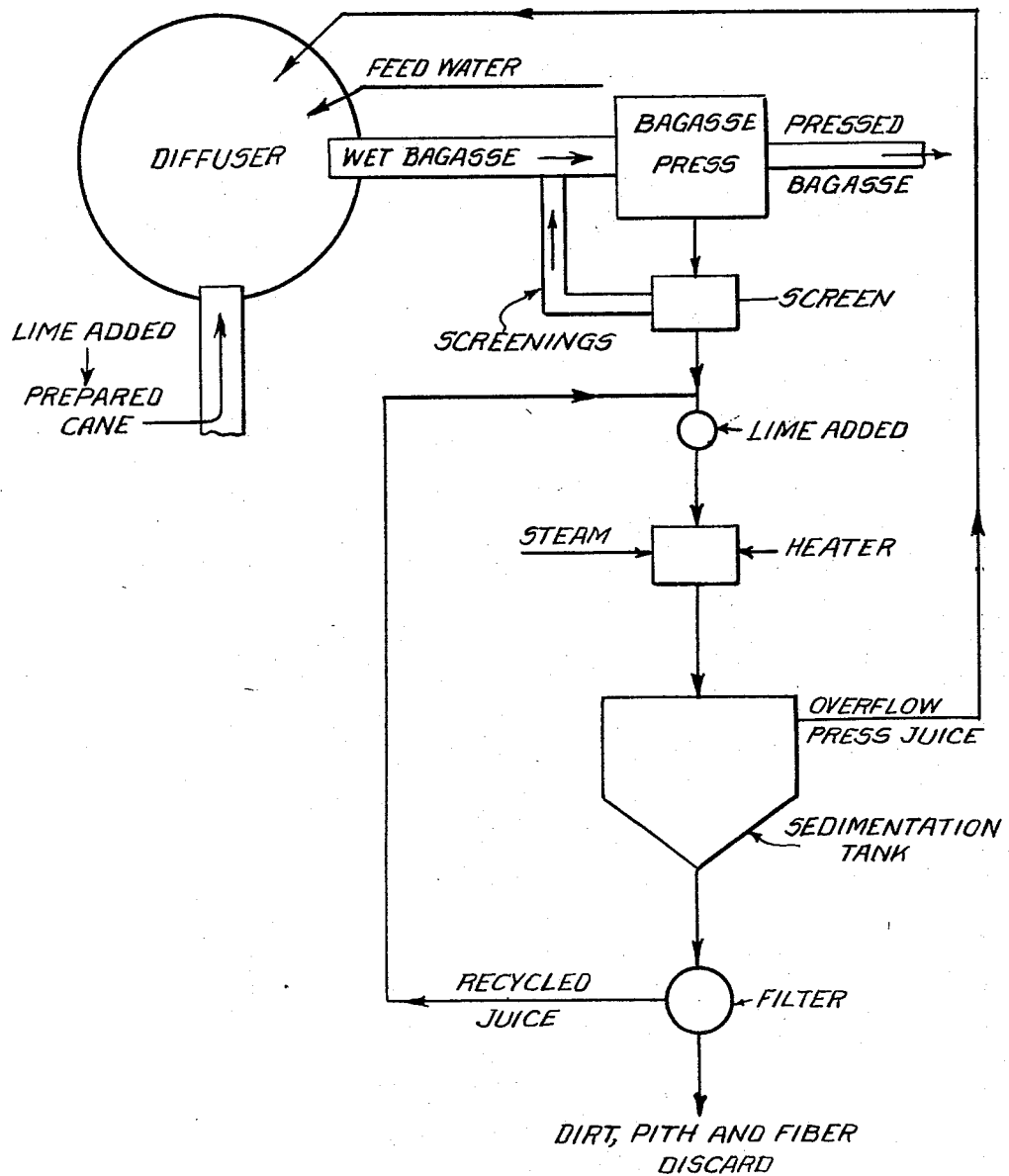

United States Patent Office 3,323,948
Patented June 6, 1967

3,323,948
PROCESS FOR THE EXTRACTION OF SUGAR
FROM SUGAR CANE
Harold F. Silver, Clarence R. Steele, and Frank B. Price, all of Denver, Colo., assignors to American Factors Associates, Limited, Honolulu, Hawaii, a corporation of Delaware
Filed Apr. 21, 1966, Ser. No. 544,309
1 Claim. (Cl. 127—44)

This application is a continuation-in-part of applicants' copending application Ser. No. 237,575, filed Nov. 14, 1962, now U.S. Patent No. 3,248,263, and entitled, "Solvent Extraction Process," which describes and claims a process for removing or extracting, by the use of a suitable solvent or solvents, soluble substances from subdivided solids by diffusion, leaching, or lixiviation.

In said copending application there is described a novel process for clarifying the extracting liquors and their dissolved contents to remove therefrom certain impurities which are capable of being flocculated or precipitated by the use of a suitable clarifying agent or agents. The diffusion process there described is especially applicable to the extraction of sugar from subdivided sugar cane, and the clarification process of this application is particularly useful in purifying sugar juices extracted from subdivided sugar cane by such diffusion procedure.

It is an object of this invention to provide a new and useful process for clarifying extracting liquors, such as sugar juice, which utilizes the mass of material undergoing diffusion as the filter bed and to do so without clogging the top surface of the filter bed or in any wise impairing the permeability of the mass undergoing treatment.

According to this invention, the clarification agent is added to the subdivided material to be treated before the material is laid down or established as a filter bed.

A further object of this invention is to provide a system for clarifying sugar juice extracted from sugar cane whereby juice of greater clarity is produced.

It is a further object of this invention to provide a process and an apparatus through the use of which juice may be extracted from subdivided material, such as sugar cane, which is purer than such extracts of the prior art.

It is a further object of the invention to provide in a system for extracting sugar from sugar cane, which employs a bagasse press to recover residual juice from the wet bagasse and returns the recovered juice to the diffusion system, a clarification procedure wherein a clarifying agent, such as lime, is added to the press juice.

Other objects and advantages of this invention will be apparent to one skilled in this art as the following description proceeds. In order to better understad this invention, a diffusion process of the type disclosed in said copending application will be described and in connection therewith the clarification means and process of this invention will be set forth in detail.

As illustrative of the invention reference will now be made to the particular forms thereof illustrated in the accompanying drawings in which.

Figure 1:
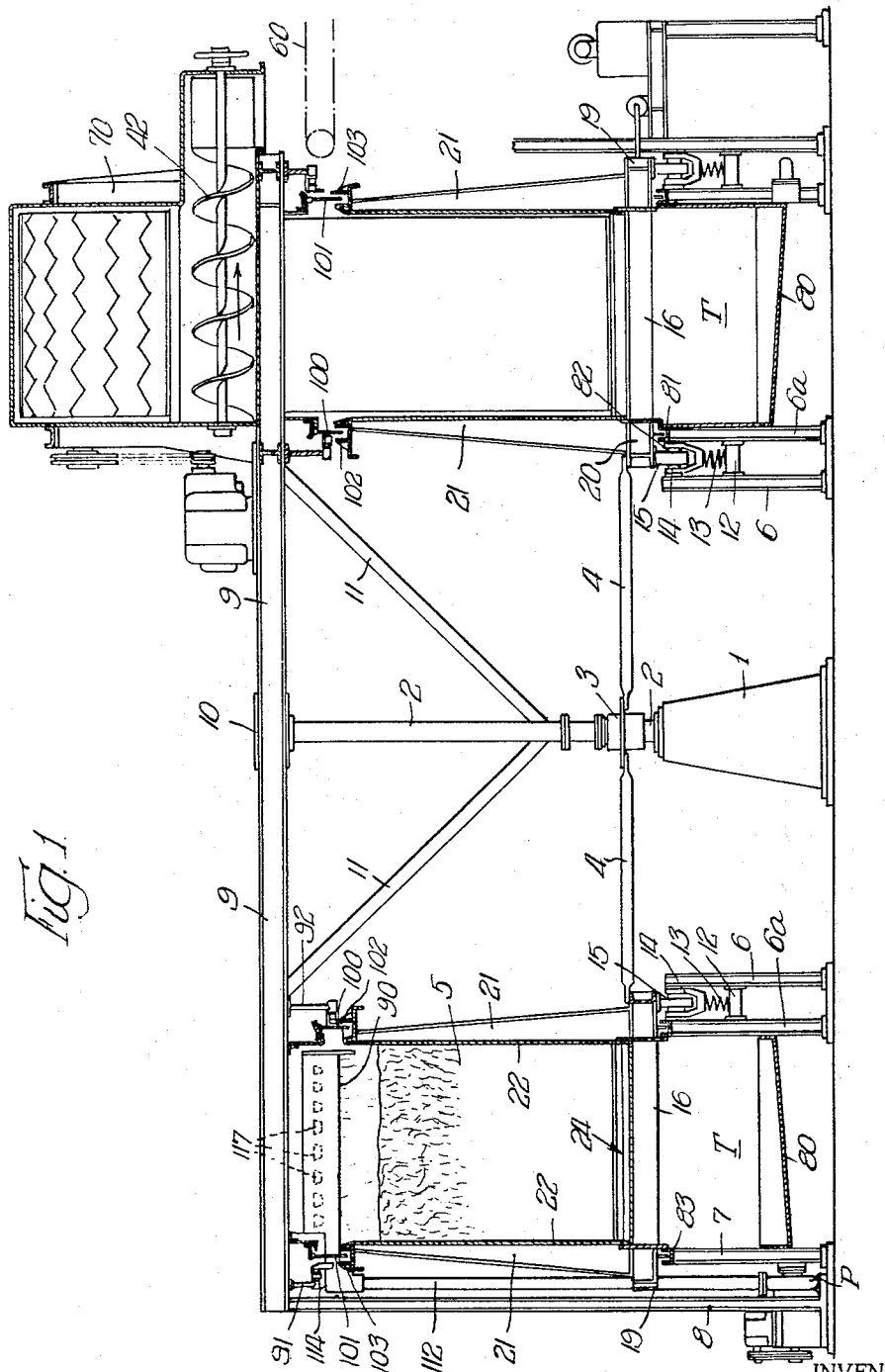
FIGURE 1 is a side elevational view partly in cross-section of a continuous diffusing, leaching, or lixiviating apparatus constructed in accordance with this invention.
Figure 2:
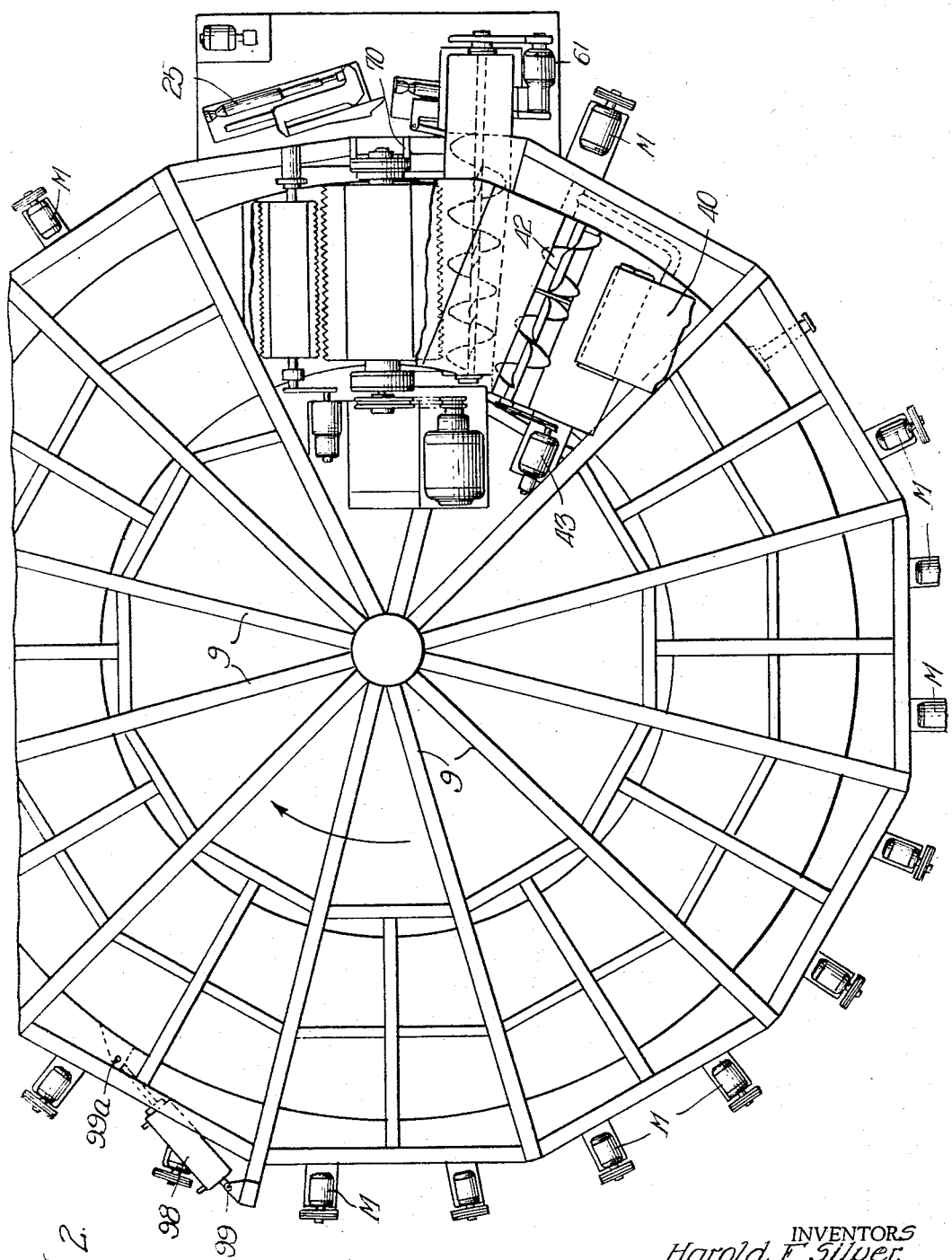
FIGURE 2 is a plan view of the apparatus illustrated in FIGURE 1.
Figure 3:
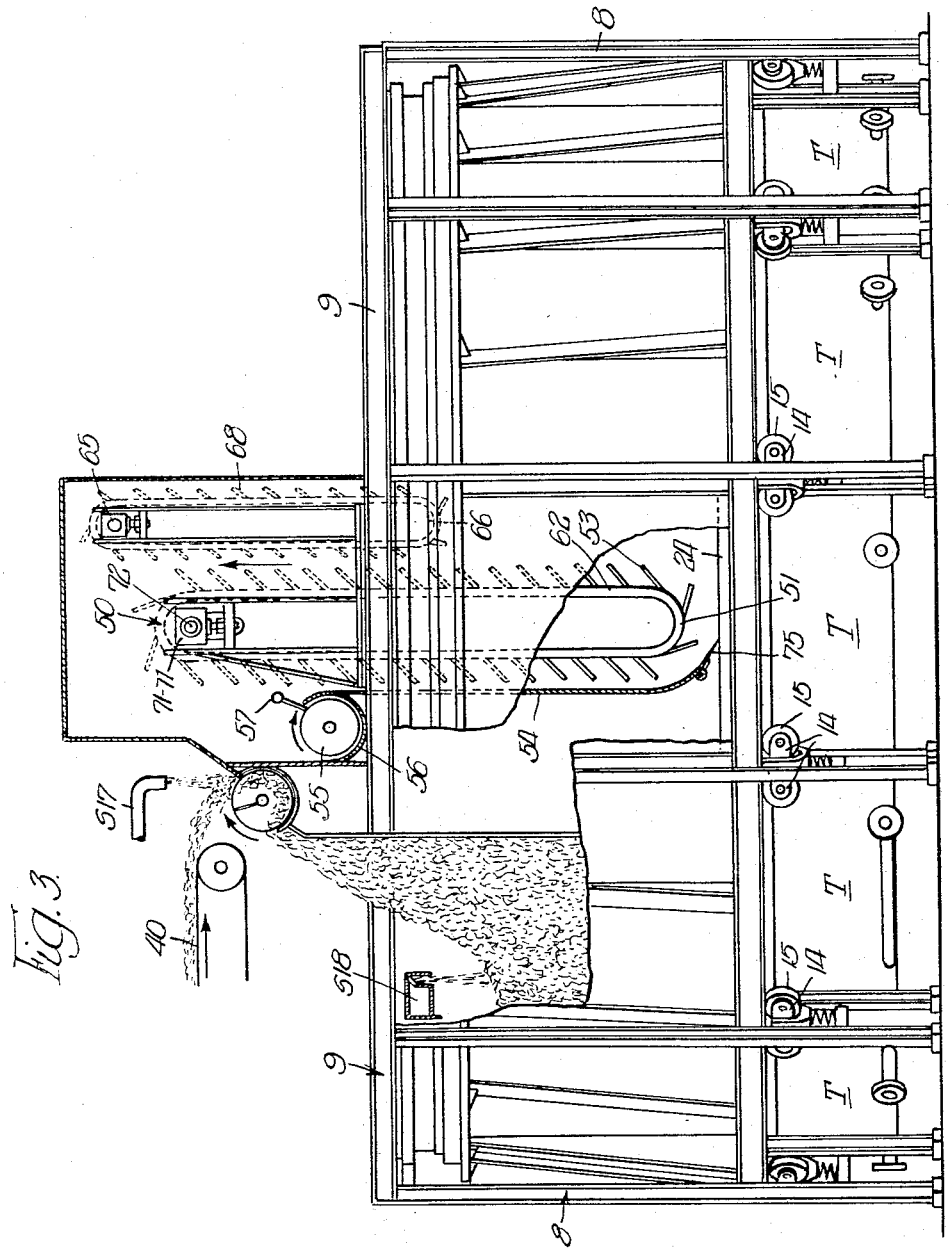
FIGURE 3 is a side elevational view of the apparatus shown in FIGURE 1 taken from a position at 90° from that of FIGURE 1 as viewed from the right. This figure is partly in cross-section to illustrate the feeding mechanism.
Figure 6:
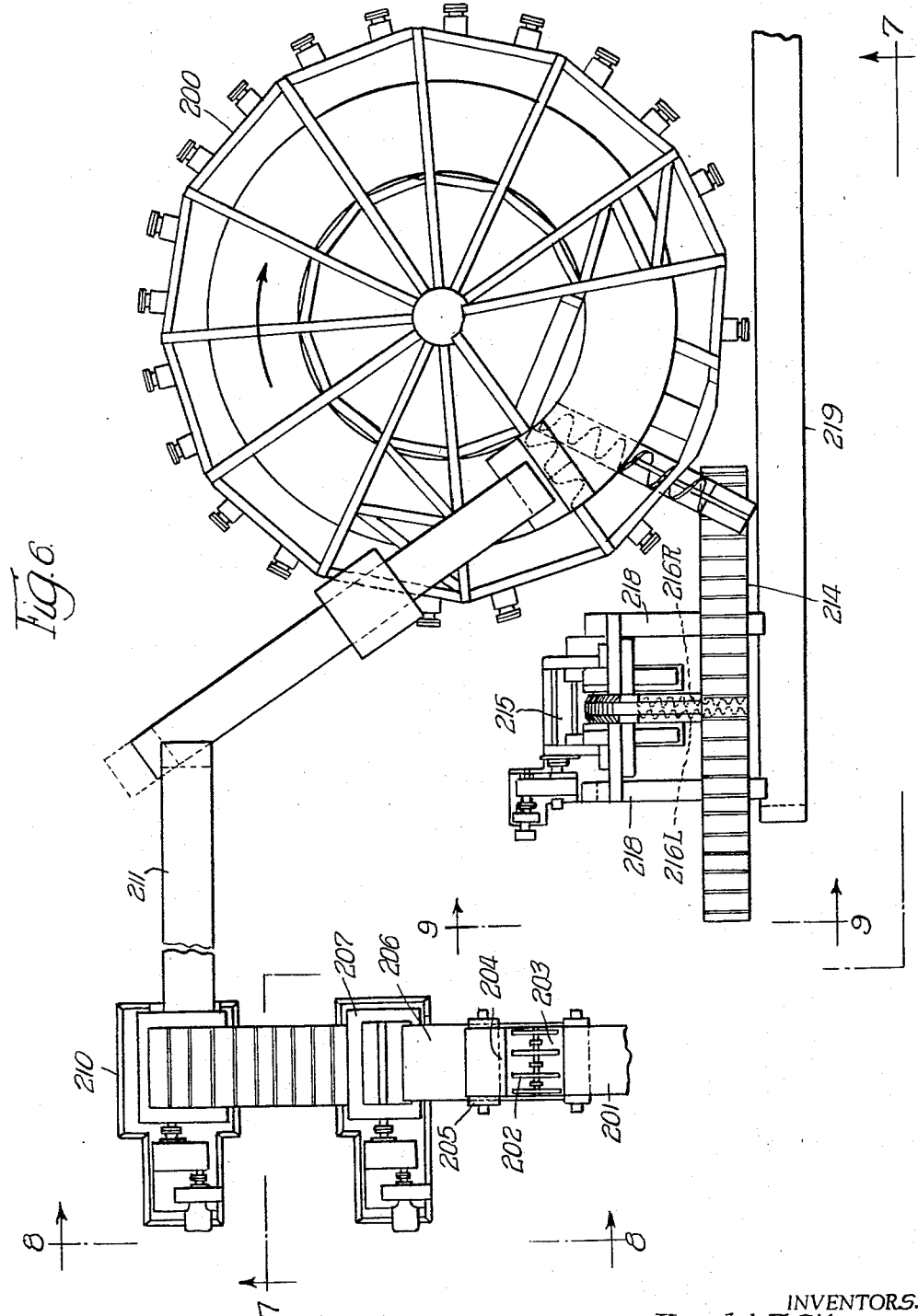
Figure 7:
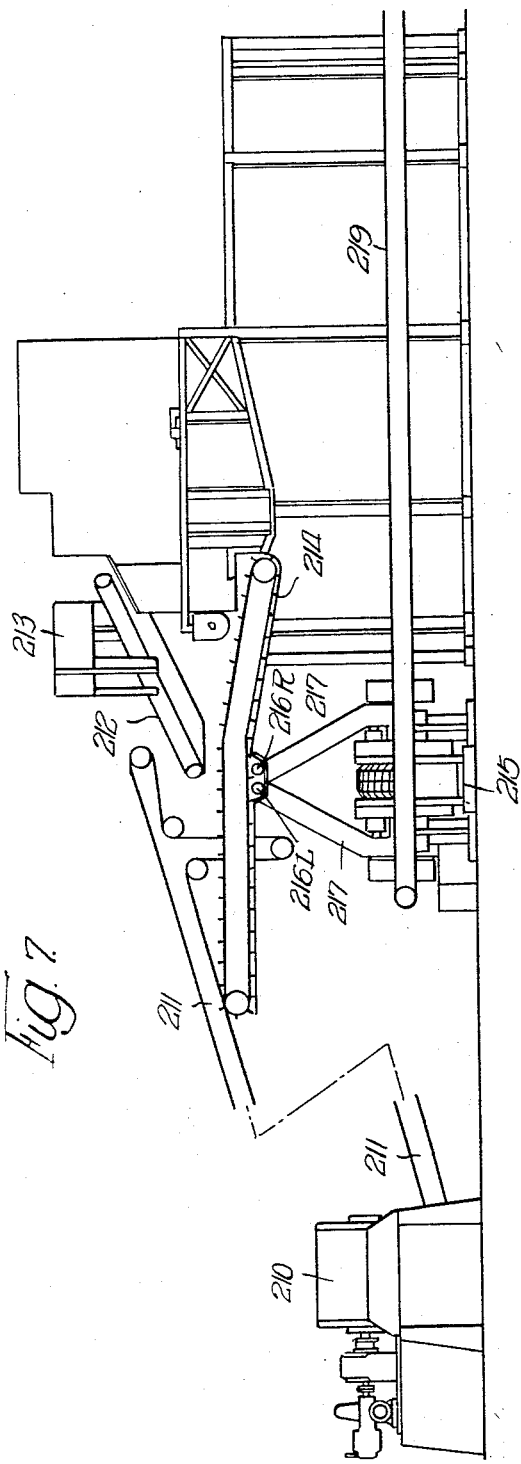
Figure 8:
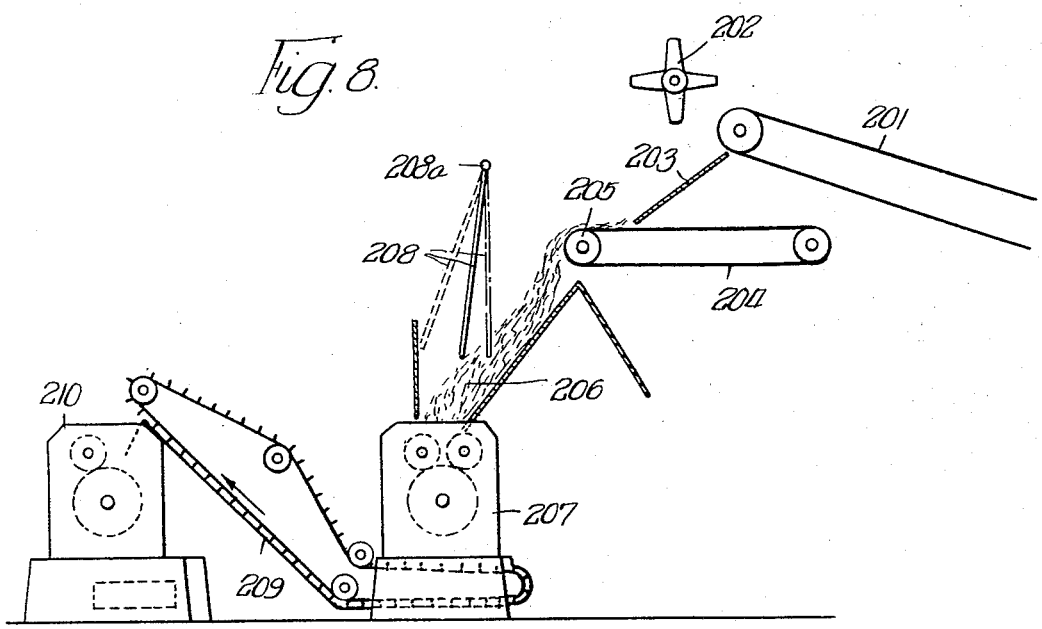
Figure 9:
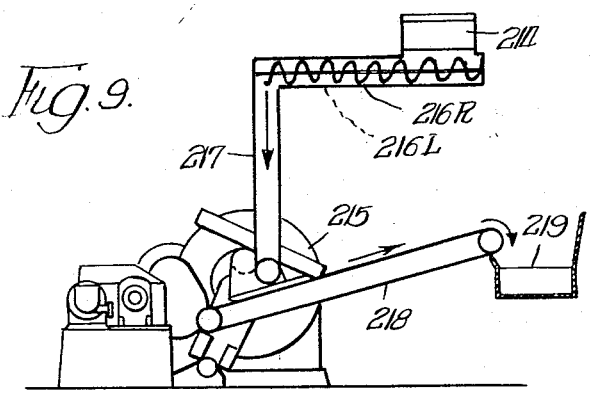

FIGURE 6 is a plan view of a system incorporating a diffusing, leaching, or lixiviating mechanism of the type illustrated in FIGURES 1 to 3, inclusive, especially adapted for processing sugar cane and which incorporates in addition to the extracting mechanism a cane buster and a cane fiberizer for preparing the cane from the field, preparatory to its introduction into the extractor, and also a bagasse press for removing from the spent cane a substantial portion of the residual juice that is carried out with it;

FIGURE 7 is a side elevational view taken on the line 7—7 of FIGURE 6 and looking in the direction of the arrows;

FIGURE 8 is an elevational view taken on the line 8—8 of FIGURE 6 and looking in the direction of the arrows;

FIGURE 9 is a side elevational view of the bagasse press as viewed along the line 9—9 of FIGURE 6 and looking in the direction of the arrows; and FIGURE 10 is a schematic view showing a flow diagram of a modified form of this invention.

Referring now to FIGURES 1 to 3, inclusive, it will be noted that the device here illustrated comprises a pedestal 1 which has an upstanding post 2 extending vertically therefrom and on which may be mounted a rotary bearing member 3 to which is suitably attached a series of radially extending struts 4—4. These struts may be of any suitable number and they extend outwardly for attachment to the rotary annular shaped material holding chamber designated 5.

Surrounding the pedestal 1 and disposed on the arc of a circle are a plurality of pairs of supports 6 and 6a disposed about the axis of the upstanding post 2 as its center. Outward therefrom are a plurality of pairs of supports 7 and 8, respectively, also arranged on the arc of a circle and disposed concentrically with respect to the sets of supports 6 and 6a. The outer post 8 of each of the outer pairs extends upwardly as shown in FIGURES 1 and 3 and is connected with a cross beam 9 which extends radially inwardly to the center attachment 10 on the post 2. As shown in FIGURE 2 a plurality of beams 9 of any suitable number may be employed, depending upon the size of the machine, and may be disposed in the manner illustrated in the drawing. Diagonal braces 11—11 may be provided as desired.

Between supports 6 and 6a there is preferably mounted a cross support 12 mounting a suitable spring 13 which supports a guided yoke 14 carrying the supporting rollers 15—15. Similar rollers are mounted between each set of supports 6 and 6a and also between each set of supports 7 and 8. Above the rollers are a series of radially disposed beams 16—16 which are attached at their inner ends to the radial struts 4—4 and which are equipped with two track-like surfaces adjacent their ends, respectively, as shown at 19 and 20, in FIGURE 1. It will be noted that these tracks are located so as to contact the rollers 15—15 and are circular so as to extend entirely around the machine for supporting the multiplicity of radial beams 16—16. Extending from each of the beams is a pair of upright supports 21—21 to which are mounted side walls 22—22, respectively. Located between the side walls adjacent the bottom thereof and supported by the series of radial beams 16—16 is an annular shaped perforated floor 24 which forms with the side walls 22—22 an unobstructed annular chamber, supported on the rollers 15—15 and adapted to rotate around the axis of the center post 2. Such rotation may be effected by suitable hydraulic means 25—25 which engage with a suitable rack not shown, disposed on the outer surface of the rotating chamber 5 whereby the chamber and its contents may be suitably rotated at any desired speed in the direction illustrated by the arrow in FIGURE 2.

Located below the rotating chamber are a plurality of solvent collecting tanks T1 to T18, inclusive, as illustrated in FIGURES 1 and 3 and as diagrammatically represented in FIGURE 4. Each tank is equipped with a pump referred to, respectively, as P1 to P18, inclusive, which draws liquid from its associated tank and pumps it to a corresponding solvent outlet identified, respectively, as S1 to S18, inclusive. Tank T1 is a relatively large one, as is tank T18. The intervening tanks, namely, tanks T2 to T17, inclusive, are, it will be noted, progressively smaller for the purpose of decreasing the area of the draining activity as the solvent advances progressively toward the end of the apparatus where the fresh material is added. It is found that in normal practice the fresh material is less compacted at the point of introduction and, therefore, is more permeable, and admits of a throughput of more solvent per unit area. In order, therefore, to maintain substantially the same quantity of solvent collected in each particular tank in a given unit of time, it is necessary to reduce progressively the area of the tanks, respectively, in the direction toward the end where the fresh material is added.

Figure 4:
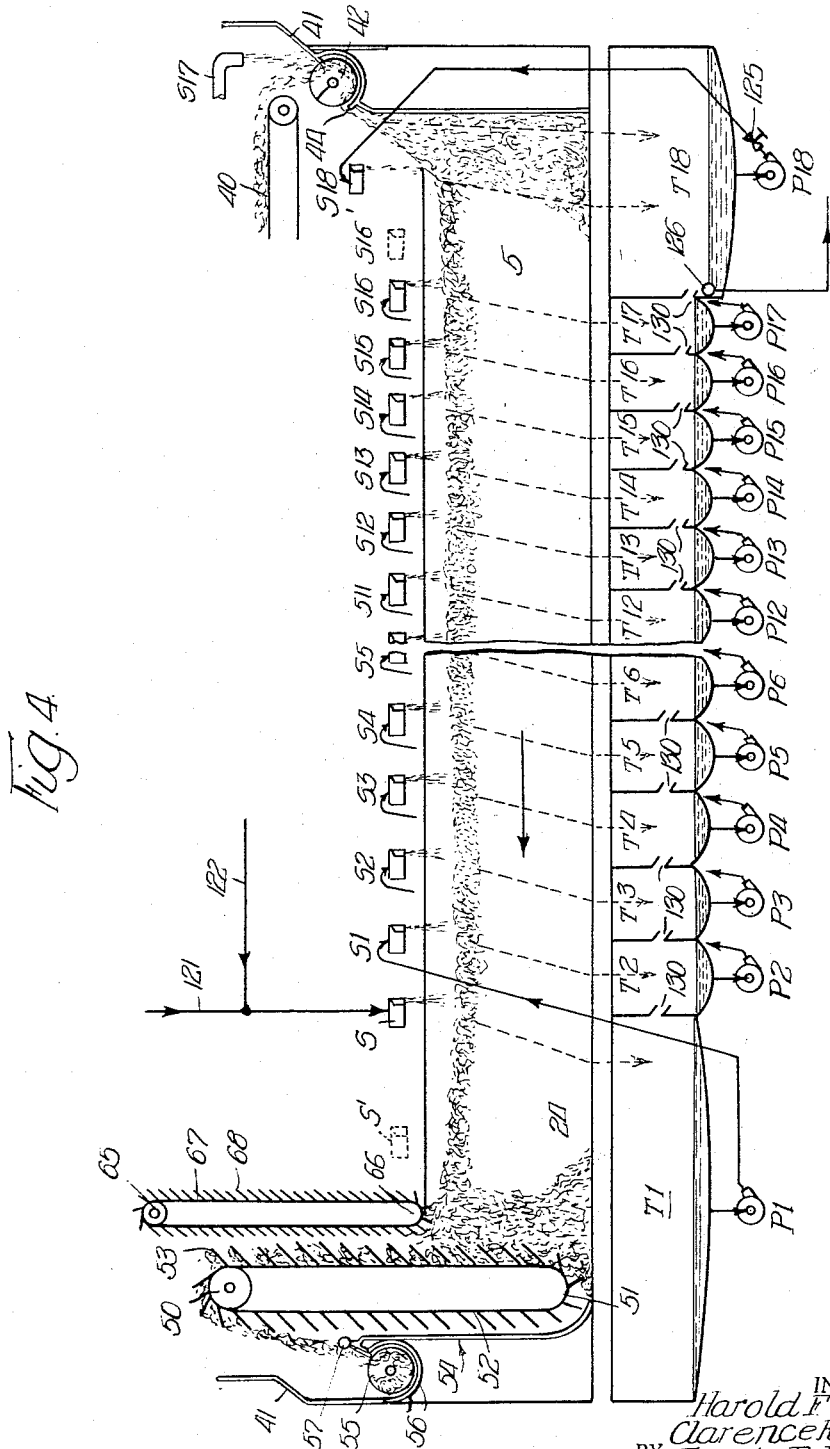
FIGURE 4 is a diagrammatic showing of the operation conducted in the apparatus illustrated in FIGURES 1 to 3, inclusive, illustrating the disposition of the solvent outlets with respect to the respective collecting receptacles below the mass being treated, all as disposed when a typical 100% circulation of the liquid is being effected.

As shown in FIGURE 4, fresh cane or other material may be fed to the apparatus from a suitable belt or other conveyor 40 and is preferably fed on to an inclined wall 41 which feeds the same to the scroll 42 in the manner illustrated. As best shown in FIGURE 2 the scroll 42 has oppositely wound spiral flights thereon extending from a point on the scroll located approximately on the center line of gravity of the underlying mass of material in the chamber 5. The rotation of the scroll may be effected by a suitable motor 43 in a direction which feeds the material, passing from the conveyor 40, outward from said center line and so as to cause the material to be discharged over the lip 44 of the housing which partially surrounds the scroll. This lip 44 may be inclined from said center line downwardly in opposite directions towards the ends thereof so as to co-act with the scroll in the production of a uniform feed of the material supplied to the apparatus throughout the width of the material holding chamber 5.

The feeding of the material with substantially uniform density across the width of the mass and with a substantially even horizontal top surface is assisted by the application of solvent through the solvent inlets S17 and S18, as illustrated in FIGURES 3 and 4. It will be noted that the application of the solvent as well as the disposition of the material fed by the scroll 42 in a circular apparatus must be such as to allow for the fact that less material and solvent are required toward the inside face of the mass than toward the larger diameter outside face. This is effected by having the scroll flights of opposite pitch meet at a point located somewhat outwardly of the center line between the two side walls of the material holding chamber.

As shown in FIGURES 1 to 4, inclusive, the spent material or wet bagasse, as the case may be, is removed from the apparatus by means of an elevating device consisting of an upper pair of sprockets 50—50 and lower shoes 51—51, around which are trained suitable chains 52—52, one at each side of the elevator, which carry a plurality of elevating members 53, disposed in the general manner illustrated in the drawings. This elevator has its downward moving flights located adjacent an end wall 54 which is associated with a scroll 55 and a scroll casing 56 which extends upwardly, as shown in the drawing, to provide an opening at the top for receiving the spent material or bagasse from the elevator. The removal from the elevator and the feeding thereof to the scroll 55 is assisted by a driven roller 57. The scroll is rotated in a direction which causes the material to move outwardly, as shown in FIGURE 1, and to be deposited upon the conveyor 60 for disposal or further treatment. As shown in FIGURE 2 this scroll is driven by suitable gearing from a motor 61.

In addition to the elevator, a hugger mechanism is preferably employed in conjunction therewith which is similarly constructed; i.e., it has a pair of sprockets 65—65 at the top and a pair of shoes 66—66 at the bottom and has mounted thereon a pair of chains 67—67, also carrying a plurality of flight members 68, disposed at an angle as shown. The hugger mechanism is preferably spaced somewhat from the elevator in the manner shown and moves at a greater speed so as to assist the elevator in picking up the material. As illustrated in FIGURE 3, the elevator derives its support from a frame member 70 mounted on the main frame structure at the proper location in the circumference of the apparatus, and is equipped with adjustable bearings 71—71 at opposite sides for supporting the shaft 72 which carries the sprockets 50—50. In addition to the portion of the frame 70 extending upwardly, a further portion extends downwardly into the material receiving chamber, but without contacting the side walls thereof. To the lower portion of frame 70 are attached shoes 51—51 so as to hold flights 53 in close relationship with the perforated floor 24 of the material holding chamber 5. Adjacent the bottom of wall 54 is a scraper 75 pivotally mounted and constructed so that its scraping edge will engage the bottom of the floor and scrape it clean and direct all of the material up toward the elevator flights 53.

Referring now to FIGURE 1, it will be noted that each of the tanks T has a bottom 80 which slopes slightly outwardly so as to feed the solvent to its pump P. Each pump will be operated by a suitable motor M as shown, particularly in FIGURE 2.

Mounted on the top of the series of supports 6a, is an annular trough 81 in which is carried a sealing liquid which cooperates with a depending annular flange 82 which is carried on the base of the radial beams 16—16, respectively. A similar trough 83 is mounted on top of the series of supports 7 which trough also carries a sealing liquid and which cooperates with an annular sealing flange 84 depending from the beams 16—16, respectively. As the side walls of the tanks T are continuous and their upper ends connect, respectively, with the troughs 82 and 83, it will be seen that the space within the tanks, respectively, and the space within the material carrying chamber 5 are in free communication through the screen bottom 24 of the chamber 5, and, whereas the chamber is freely rotatable on the supporting rollers 15 with respect to the underlying tanks, these spaces are effectively sealed from the exterior atmosphere.

Figure 5:
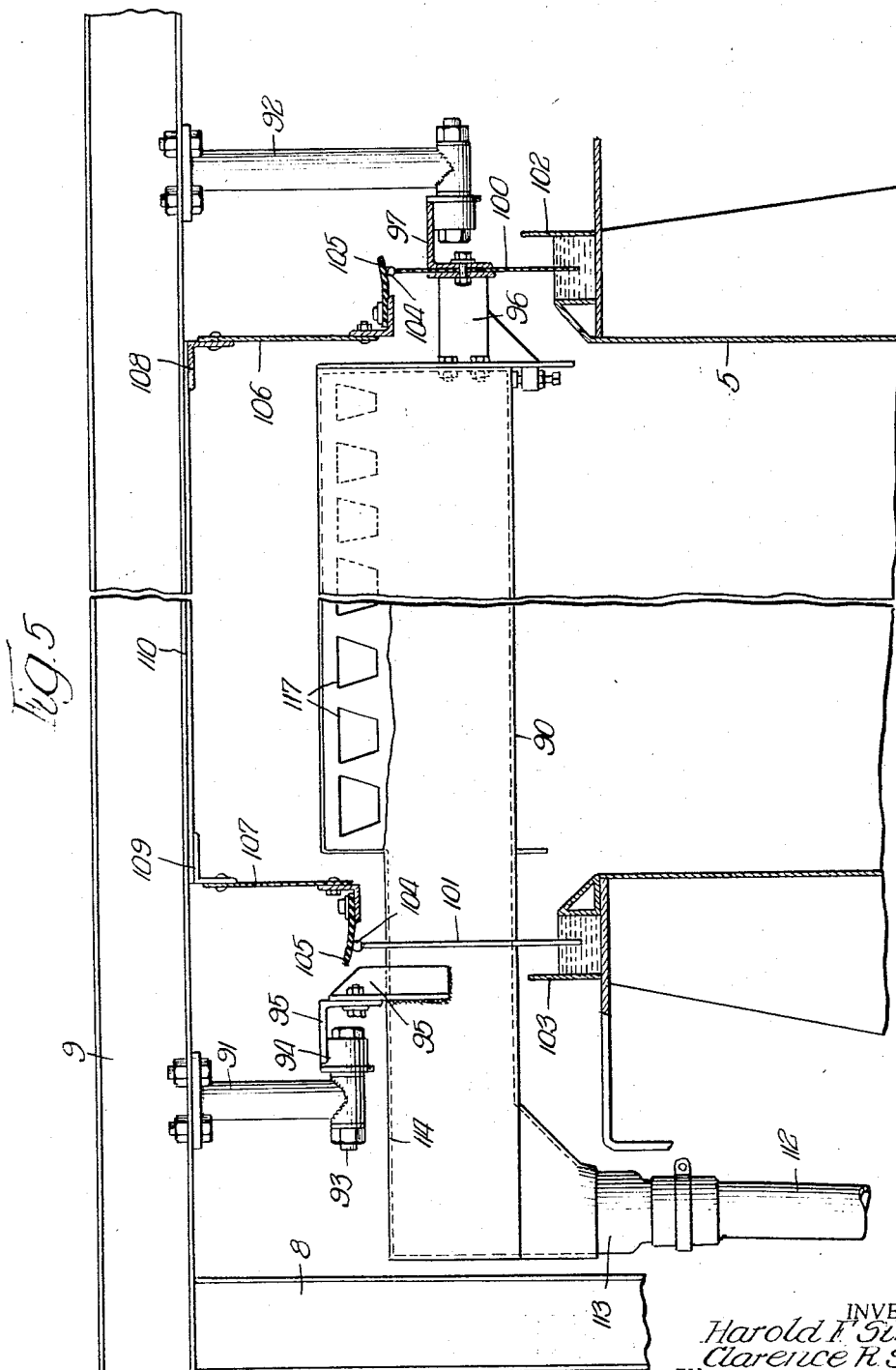
FIGURE 5 is an enlarged view partly in cross-section of the solvent outlet mechanism illustrated in the upper left-hand corner of FIGURE 1.

The form of the solvent outlet trough mechanism employed for the device here disclosed is shown in the upper left-hand corner of FIGURE 1 and in greater detail in FIGURE 5. When referring to these figures it will be noted that the solvent outlet troughs 90 are shown in the form of a radially disposed container which is supported from an adjacent beam 9 by means of depending supports 91 and 92, through a circular track mechanism hereinafter described. These supports may be of any suitable construction, but as here shown support 91 is provided with a stub shaft 93 on the end thereof rotatably carrying a roller 94. Similarly, support 92 carries a stub shaft 93 and a supporting roller 94. It is to be understood that a series of such supports 92, with their associated rollers, are provided on a plurality of beams 9 with the rollers, respectively, disposed on the arc of a circle around the shaft 2 as a center and also that a plurality of supports 91 will likewise be provided with their rollers 94 disposed on the arc of a circle concentric to the inner rollers 94.

The troughs are provided with a track member 95 which is welded or otherwise secured to the troughs and which is formed as a complete circle around the mechanism and is disposed so as to have rolling and supporting engagement with the outer set of rollers 94. At the inner end of the trough a support 96 is provided which carries a circular track member 97 which has supporting and rolling engagement on the inner set of rollers 94. Suitably carried by the troughs is cylindrical member 100 adjacent the inner end thereof, and a larger but similar cylindrical member 101. These cylindrical members are securely attached to the troughs, respectively, and provide the structural members which maintain the troughs in proper angular disposition. When mounted in the manner described; i.e., with the inner track member 97 supported on the inner rollers 94 and the outer track member 95 supported on the outer rollers 94, it will be seen that the series of solvent outlet troughs is mounted for angular displacement so that the position of the solvent outlets, as a unit, may be adjusted as desired. As shown particularly in FIGURE 5 the inner cylindrical member 100 is so disposed that the bottom portion thereof depends and cooperates with a trough 102 which is carried by the mechanism constituting the material holding chamber 5 so that it moves therewith. Also the bottom edge of the cylindrical member 101 depends in similar fashion and cooperates with a liquid holding trough 103 which is likewise carried by the structure constituting the material holding chamber 5. The upper edges of each of the cylindrical members 100 and 101 is equipped with a sliding surface 104 adapted to have frictional contact with a flexible sealing ring 105—105 suitably secured, respectively, to depending cylindrical skirts 106 and 107, respectively. Whereas these skirts are cylindrical throughout the portion of the device serving to hold the material undergoing treatment they are interrupted in that portion thereof where the elevator and feeding mechanisms are positioned. As shown in FIGURE 5 these skirts, respectively, may be attached to the supporting beams 9 by means of suitable curved angle rings 108 and 109, respectively. The space between the angle rings 108 and 109 is closed by a suitable roof 110 attached to the underside of the beams 9, which roof may be equipped with inspection and access doors at suitable locations.

Referring now, particularly, to FIGURE 1, it will be noted that the solvent supplied to each trough is taken from the corresponding tank T located beneath the material holding chamber 5 by the associated pump P which is attached to an upwardly extending flexible hose 112 which is connected at its upper end to an inlet member 113 in connection with the end of the solvent trough 90. The flexible hose 112 will be of such character and of sufficient length to permit the connection between the pump and the trough to be maintained throughout all positions of adjustment of the trough. It will also be noted from the foregoing that when the troughs are moved as a unit, as above indicated, an effective seal is maintained at all times in the space occupied by the trough above the material holding chamber 5. It should be noted, however, that, at the location on the diffuser where the fresh material is introduced and the spent material is removed the space corresponding to that occupied by the solvent troughs is merely suitably closed, but is not completely sealed from the atmosphere.

The solvent trough preferably has a general shape of a truncated wedge, and adjacent the inlet end is provided with a top cover 114 which creates a chamber in communication at its inner end with that portion of the trough which is disposed in solvent feeding relationship to the material contained in the material holding chamber 5. The solvent flows from the trough through a plurality of openings 117 which may be of any suitable shape, but preferably trapezoidal, and disposed, as shown, with the shortest side downwardly. In addition the width of these trapezoidal openings is progressively diminished for each successive opening from the outside inwardly so that the amount of solvent passing therethrough by a gravitational flow is controlled approximately to correspond with the quantity of material underlying each of the openings of the trough. The space defined by the baffle plate and the side wall of the trough is preferably closed at its ends so as to avoid unwanted splashing of the solvent. In operation it will be noted that the liquid pumped in through hose 112 enters the inlet end of the trough at 113 and then flows radially inwardly until it reaches the portion thereof which is open at the top. Here the liquid level will be free to rise until the gravitational flow through the outlet openings will equal the amount of liquid supplied from the pump P.

The value of the trapezoidal shape of the openings is to maintain the proper relationship between the flow through the openings, respectively, for all quantities of solvent supplied therethrough.

An understanding of the over-all operation may be gained by inspecting FIGURE 4 where there is shown a schematic development view representing the 360° of a circular diffuser of the type previously described. As already pointed out, the fresh material is fed by the scroll 42 in such manner as to create a mass in the material holding chamber 5 which has a substantially rectangular cross-section. This mass, being supported on the perforated bottom 24 of the material holding chamber 5, and being held by the sides 22 thereof, is caused to move at a predetermined rate from a position on the right-hand side of FIGURE 4 to the left-hand side thereof, where the spent material is discharged as represented by the arrow 120. In addition, the introduction of fresh material has been effected in such manner as to establish continuously a mass which has substantially uniform bulk density throughout and, therefore, substantially uniform permeability for the percolation of solvent. The single qualification to be made in this respect, however, is the circumstance that fresh material is generally less compacted than that which has undergone treatment in the diffuser and, therefore, there is a slight diminution of the permeability progressively from the inlet to the outlet end of the material holding chamber 5. In addition the feeding has been carried out in a manner so as to assure a substantially even top surface of the mass.

As shown in FIGURE 4 it will be noted that the solvent collecting tanks T1 to T18, inclusive, are stationarily attached and maintained in a fixed disposition with respect to the inlet and outlet ends, respectively, of the moving mass of material undergoing treatment. However, as above pointed out, the solvent outlet troughs are adjustable as a suit by limited angular movement so that the said solvent outlet troughs can be given, as a group, a selected and predetermined position overlying the material undergoing treatment, thus creating a particular relationship with the underlying tanks.

The power means for effecting the angular movement of the solvent outlet troughs may be of any suitable type, but as here shown on FIGURE 2 it comprises a conventional double acting hydraulic cylinder 98 connected at one end to a stationary part as at 99 and at its other end to the track ring 95 as at 95a.

With these capabilities in mind it will be noted from FIGURE 4 that, when sugar cane is being treated and the mass has been established in the manner above indicated, the diffusion of sugar from the cane may be carried out by first introducing into a trough S solvent which is preferably made up of fresh water supplied through pipe 121 and press juice from the bagasse introduced through pipe 122. This solvent permeates the mass and, by virtue of its percolation therethrough, is collected in the preferred operation in tank T1. From the bottom of this tank the solvent is taken into the inlet of pump P1 and supplied to the trough S1. Correspondingly, the solvent from trough S1 percolates through the underlying mass and, in accordance with the preferred operation, is collected in tank T2. The solvent in tank T2 is, in turn, pumped by a pump P2 to the trough S2 and progressively on and on in a similar manner throughout the entire system until the solvent supplied to trough S16 finds its way into tank T17. At this point the solvent from tank T17 is pumped by pump P17 up to the outlet S17 which, it will be noted, feeds the solvent directly on to the fresh cane being supplied from the belt 40 to the scroll 42. This solvent finds its way into the tank T18, which is equipped with a pump P18, and from there it is pumped upwardly to the trough S18. As a result, the solvent from trough S18 also finds its way into tank T18 in a recirculating relationship. By this arrangement, although the solvent in tank T18 is a single body of liquid, that which is found at the right-hand portion thereof is primarily supplied from solvent outlet S17, whereas that occupying the left-hand portion of the tank is predominantly derived from solvent outlet S18. It is important in this operation to have the liquid from both solvent outlets S17 and S18 collected in the single tank T18 held in a single chamber as shown. This insures that, at all times, an adequate amount of solvent will be available to pump P18 for recirculation through solvent outlet S18 to maintain the desired quantity of solvent in contact with the material mass thereunder. Control valve 125, located in the line between pump P18 and trough S18, permits the adjustment of the amount of solvent taken from the tank T18 and supplied to outlet S18 so as to prevent flooding at the top in this area and, at the same time, to maintain a maximum quantity of solvent in contact with the material mass. The finished diffusion juice is taken from the system through an overflow outlet 126 by means of a withdrawal pipe 127. It will be noted that the location of the overflow outlet 126 at the left-hand side of tank T18 is such that the solvent supplied to it will generally be that from solvent outlet S18. It will be noted that the walls separating the tanks T1 to T18, inclusive, have overflow openings 130 therethrough at successively lower levels to provide an appropriate path for the solvent during emergency operation in the event of the failure of any one pump. The openings 130 are restricted to lessen undesirable mixing of the solvent of different concentrations, in the event of a complete shutdown, when all of the solvent will drain from the material into the underlying receiving tanks. The dotted line representation of trough marked S16' on FIGURE 4 indicates the position of trough S16 when the solvent outlet troughs collectively are adjusted as a unit to an advanced position effecting that type of operation wherein there is less than 100% solvent throughput through each zone. In this connection, it is to be noted that solvent outlets S17 and S18, which are positioned with respect to the inlet scroll 42, are not movable with the other solvent outlet troughs in connection with such adjustment.

The dotted line representation of trough marked S' on FIGURE 4 represents the location of the trough S when the solvent outlet troughs, as a unit, are adjusted to their most retarded position. This adjustment is established for the purpose of merely recirculating the solvent within each zone when there is a lack of supply of fresh material to be treated and the movement of the material holding chamber 5 is discontinued.

An important feature of the elevator device is the ability thereof to effect final drainage of solvent from the spent material. Any such solvent passes down the sloping top surfaces of the flight members 53 and runs down to the material carrying chamber 5 between the said flight members and a vertical rubbing plate that is part of the elevator frame 70.

In the operation of this system for the extraction of sugar from sugar cane, as above described, advantage can be taken of certain novel features of this apparatus which allow the operator to carry out a clarification step which clarifies the sugar juice in the diffuser itself, thus reducing or eliminating the need for subsequent clarification.

In order to do this, and assuming an operation on a 100% or over juice circulation basis, the juice from pump P17 will have added to it an appropriate quantity of milk of lime or other suitable clarifying agent, the mixture of which will then be suitably heated for flocculating activity and delivered to solvent outlet S17. At this point the solvent, with its flocculated and suspended impurities, is added to the fresh fiberized cane in the diffuser where the cane mass serves as a filter to catch and retain the flocculated impurities. Hence, as the juice drains through the mass the flocculated and suspended impurities tend to remain in the fibrous mass and thus become separated from the juice. Any suspended solids which pass through the mass with the juice and find their way into tank T18 will be recirculated through pump P18, with the result that a high level of clarification will be imparted to the finished juice to be removed from the system at the left-hand side of tank T18. If the system is being operated on a juice circulation basis of 50% then all of the juice from pump P16 may be diverted from the solvent outlet S16 and added to the juice from pump P17 for use in the clarification treatment. For operation on any intermediate juice circulation basis a proportionate amount of juice from pump P16 may be diverted from solvent outlet S16 and added to the juice from pump P17 for use in the clarification procedure.

It will be noted that the first juice may be applied to the cane or other material from distributor S17 and deposited on the cane after the fiberized cane has been deposited in the chamber 5 and has been formed into a mass to be treated. In some instances, this method of depositing the juice on the fresh cane is preferable to applying the juice to the cane as it is fed into the feeder, as shown in FIGURE 4.

Also, it should be understood that the milk of lime, when employed for clarifying sugar juice, may be introduced somewhat ahead of the diffuser feed, as proposed in the form illustrated in FIGURE 4, and may be fed into the cane material as the material is introduced into the cane buster. When this is done, the non-corrosive benefits that flow from the lime introduction are realized in the machinery employed for processing the cane prior to its being introduced into the diffuser.

The extracting apparatus described above is particularly constructed and adapted for use in connection with sugar cane employing what may be regarded as a diffusing operation. However, it is to be understood that this invention is equally applicable to other solvent extraction operations such as, for instance, the treatment of sugar beets, alfalfa, wood pulp, and any other materials which lend themselves to procedures of diffusion, leaching, and lixiviation. Such uses will include those employing either aqueous solvents or non-aqueous solvents.

In realizing the advantages of this invention in the extraction of sugar from sugar cane it is highly important to have the cane so prepared that the treated mass possesses the proper characteristics as to bulk density and permeability. It has been found that the preferred character of the cane fibers is that which gives to the product a permeability which will permit a satisfactory extraction at a draft of approximately 100. It has now been discovered that through the use of suitable instrumentalities sugar cane can be so prepared as to reduce it to a fibrous condition having associated with the fibers thereof the natural pith, and that when the cane is so fiberized it presents a mass for treatment to the diffusing system which permits the carrying out of a diffusing operation employing a minimum amount of extracting solvent. Accordingly, one form of this system utilizes, in addition to the diffusing apparatus above described, additional instrumentalities for reducing the cane to the desired fiberized state previous to its introduction into the diffuser.

In addition, an important savings is realized in a system of this type by returning to the diffuser a substantial amount of the juice that is removed therefrom with the discharged wet bagasse. Accordingly, the system here referred to includes, as an additional instrumentality, a bagasse press which receives the wet bagasse from the diffuser and returns the recovered juice to the diffuser.

A system so constituted is illustrated in FIGURES 6 to 9, inclusive, wherein it will be seen that, in addition to the diffuser 200, a cane buster 207 is employed initially to process the cane.

In operation the cane from the field, with or without previous cleaning, is introduced to the system on a moving cane carrier conveyor 201, which presents the cane to rotary cane knives 202, which cut the cane into sizes producing a handleable mass. The cane so cut moves across the plate 203 and is advanced by the belt 204 over a magnetic pulley 205 which serves to remove any tramp iron. The cane is then fed into a hopper 206 above the cane buster 207. Preferably a sensing plate 208 is employed, mounted on a pivot 208a, so that it may be displaced in a manner representative of the quantity of cane being held at any one time in the hopper. The apparatus is so constructed that the angular position of the sensing plate is connected to control the speed of the cane carrier conveyor, with the result that the desired amount of cane is at all times available to the cane buster. The cane buster further reduces the size of the pieces of knifed cane and produces therefrom a mass of cane in the proper form to be presented to the cane fiberizer. The construction and operation of the cane buster is described in greater detail in the above-identified copending parent application. The cane so reduced in the buster is carried by a conveyor 209 outwardly from the bottom of the buster and thence upwardly and deposited in the top of the cane fiberizer 210. The construction and operation of the fiberizer is also described in greater detail in said copending application. The fiberized cane passes from the fiberizer upwardly on a belt 211 and is deposited on a scale conveyor 212 which serves to convey the fiberized cane to the diffuser 200 and, by suitable mechanism, not shown, contained in the housing 213, to weigh and record continuously the amount of fiber to be processed. The fiberized cane is fed by the scale conveyor 212 to the material feeding scroll of the diffuser. In other words, the scale conveyor 212, as illustrated in FIGURES 6 and 7 of the drawings, corresponds to the feeding belt 40 illustrated in FIGURES 2 and 3. After the fiberized cane is deposited in the diffuser and formed into an elongated mass, as above described, it is subjected to a diffusing operation the same as that already referred to. After being so processed the spent cane or wet bagasse is removed from the diffuser by the scroll 55 and delivered to a conveyor 214 which conveys it to one or more bagasse presses. The conveyor 214, illustrated in FIGURES 6, 7, and 9, corresponds to the conveyor 60, illustrated in FIGURE 1. In the particular embodiment here illustrated only a single bagasse press is shown, but it is to be understood that two or more may be employed, if required, for parallel operation. Accordingly, conveyor 214 is illustrated as extended in order that excess material which cannot be received by the first bagasse press will be moved on to the next press. The bagasse press 215 receives wet bagasse from the conveyor 214 by passage first through a pair of oppositely revolving scrolls 216R and 216L, the function of which is to receive and convey from the conveyor 214 the particular amount of bagasse that can be handled by the particular bagasse press being fed. Hence, wet bagasse that is not accepted by the scrolls 216R and 216L will be carried beyond by the conveyor 214. From the end of the scrolls 216R and 216L the wet bagasse passes downwardly through two chutes 217—217 in order that it may be equally fed to the press to both sides thereof. The pressed bagasse is discharged from the press through both sides thereof onto two conveyors 218—218, which are driven to discharge the carried pressed bagasse to a main pressed bagasse conveyor 219, which removes it for disposal. The juice extracted from the wet bagasse is pumped from the press through suitable piping, not shown, to the feeding pipe illustrated on FIGURE 4 and identified by the numeral 122.

The extraction system herein described is capable of being adapted to substances having a wide range of different characteristics so long as the substances are suitable for percolative removal of soluble solids by a solvent.

The arrangement of solvent outlets and collecting tanks thereunder may be constructed with any increment of increase or decrease of distance between the successive stages of treatment to suit any change in the permeability in the material mass as it progresses through its path of travel. The solvent outlets as a group may be made angularly or linearly adjustable over as large a number of treatment zones as desired by increasing the arcs of the first and last collecting tanks with respect to the sum of the arcs of the intermediate tanks and by arranging the solvent outlets to correspond.

In the embodiment shown on the drawings, the solvent outlets are adjustable over a range of four treatment zones. This wide range of adjustment makes it possible to compensate for large variations in permeability of material masses without significant loss of capacity.

For the purpose of increasing the efficiency of extraction or for suppressing bacterial growth in the treatment of certain substances the use of heat may be employed. This can be accomplished by the use of heat exchangers for the solvent at any desired points, or by the direct injection of vapor or steam where aqueous solvents are used.

With the system operated either hot or cold, certain chemicals, such as chlorine, formaldehyde, or sulphur dioxide, may be used for the control of bacterial growth.

In the form of the invention illustrated in FIGURE 10, the clarification agent is added to the system in two places. For instance, when the invention is applied to the clarification of sugar juice, the lime is added to the subdivided cane before the cane is deposited as a diffusion bed as above described and, in addition, lime—preferably in the form of lime water—is added to the bagasse press water which is then returned to the system.

This form of the invention may be best understood by referring to the schematic flow diagram illustrated in FIGURE 10. When considering this illustration, it should be understood that the parts there represented, which are common to the apparatus above described, may be constructed and operated in the same manner as are the corresponding parts illustrated in FIGURES 1 to 9, inclusive. This form, however, includes in addition a sedimentation tank into which passes the press water and the added milk of lime wherein the dirt, pith, fiber, and other impurities are removed therefrom.

In this method where lime is introduced at two different places in the system, one introduction is made in accordance with the practice above described—that is to say by adding the lime to the subdivided cane before the cane is introduced into the diffuser so that the lime is already intermixed with the subdivided cane when the cane is formed into a bed of material in the diffusion chamber. In addition, lime is also added, preferably as milk of lime, to the press juice from the bagasse press or presses. After the addition of the lime to the press juice, the juice and lime are preferably partially screened—as for instance over a stationary wedge-wire screen—for the removal of large fibers, which are returned to the wet bagasse being fed to the press. After this initial coarse screening, the juice has added to it a quantity of milk of lime. This limed press juice is then heated, preferably by direct low-pressure steam injection, and then directed to a sedimentation tank wherein the lime assists in the flocculation and settling of the suspended solid particles of dirt, pith, fiber, and other impurities.

The overflow of press juice from the sedimentation tank comes off as a partially clarified liquid, and is directed back to the diffuser as part of the supply water feeding the diffuser near the point where the spent bagasse is removed from the diffusion chamber.

A small portion of the press juice in the sedimentation tank is drawn off at the bottom to remove the dirt, pith, fiber, and other impurities that have settled out. This underflow is directed to a filter, preferably a vacuum-drum type or travelling-belt type, where the dirt, pith, fiber, and other impurities are discarded, and the juice is recycled through the sedimentation system by being added to the press juice just ahead of the point where the lime is added.

As an alternative method for handling the underflow from the sedimentation tank, in certain instances the underflow with the dirt, pith, fiber, and other impurities may be directed to the point where the wet bagasse passes from the diffuser and there introduced into the wet bagasse and fed with it to the bagasse press. When the system is operated in this manner, all of the dirt, pith, fiber, and other impurities would be discarded with the bagasse. In such instances, the recycled load of dirt through the sedimentation system would in all probability be somewhat greater resulting in the press juice, which is fed back to the diffuser, being somewhat less clarified. Whereas this alternative method is not the preferred form, it would be somewhat less expensive and may be adequate in certain specified installations.

With the addition of lime to the press water as above described, the effect of the lime to some extent at least in certain installations will be carried through the diffuser with the juice, with the result that less lime will be required for addition to the subdivided cane at the head-end of the system.

The term "subdivided solids" as used in the appended claim is intended to include solid substances existing as particles, such as grain or the like, as well as substances which have undergone subdivision by breaking, cutting or other action.

The forms of this invention herein disclosed are illustrative and are given only by way of example. The scope of the invention is not to be limited thereby as it is intended that the appended claim be construed as broadly as may be permitted by the prior art.

We claim:

In a process for the extraction of sugar from sugar cane, the steps which comprise:
supplying to a diffusion apparatus subdivided solid pieces of cane to form a filter bed comprising a mass of solid pieces of cane,
intermixing lime with the cane before said pieces form said mass constituting the filter bed in the diffusion apparatus,
removing the subdivided cane in the form of spent bagasse from said diffusion apparatus,
pressing said spent bagasse to form an expressed sugar juice,
treating said expressed sugar juice by addition of lime thereto,
separating impurities from said sugar juice, and
introducing at least a portion of said sugar juice into said diffusion apparatus.

References Cited

UNITED STATES PATENTS 1,015,941  1/1912  Corcuera _____ 127—45

OTHER REFERENCES

Seidel, G. M.: The Vazcane Process, Ind. and Eng. Chem., vol. 22, July 1930, pp. 765–768.

Willcox, O. W.: Next: Sugar Cane Diffusion, Sugar, vol. 46, May 1961, pp. 28–30.

MORRIS O. WOLK, *Primary Examiner.*

M. E. ROGERS, *Assistant Examiner.*